United States Patent
Olson

(10) Patent No.: US 11,105,568 B2
(45) Date of Patent: Aug. 31, 2021

(54) SYSTEM AND METHOD FOR MANAGING SOURCE FLUID

(71) Applicant: Gaylord Olson, Princeton, NJ (US)

(72) Inventor: Gaylord Olson, Princeton, NJ (US)

( * ) Notice: Subject to any disclaimer, the term of this patent is extended or adjusted under 35 U.S.C. 154(b) by 0 days.

(21) Appl. No.: 16/907,242

(22) Filed: Jun. 20, 2020

(65) Prior Publication Data

US 2021/0102764 A1    Apr. 8, 2021

Related U.S. Application Data

(63) Continuation-in-part of application No. 16/592,538, filed on Oct. 3, 2019, now Pat. No. 10,724,769.
(Continued)

(51) Int. Cl.
*F28F 27/02* (2006.01)
*F28D 20/00* (2006.01)
(Continued)

(52) U.S. Cl.
CPC ............ *F28F 27/02* (2013.01); *F25B 27/002* (2013.01); *F28D 20/0052* (2013.01); *G05D 7/0652* (2013.01)

(58) Field of Classification Search
CPC ........ F25B 27/002; F25B 41/003; F25B 5/20; F25B 6/02; F25B 2313/002; F24F 2005/0057
See application file for complete search history.

(56) References Cited

U.S. PATENT DOCUMENTS

| 4,012,920 A | 3/1977 | Kirschbaum |
| 5,081,848 A * | 1/1992 | Rawlings ............... F25B 30/06 62/260 |

(Continued)

FOREIGN PATENT DOCUMENTS

CN    108088009    * 5/2018 ............... F24F 5/00

OTHER PUBLICATIONS

English Translation of CN 108088009 (Year: 2017).*
(Continued)

*Primary Examiner* — David J Teitelbaum
(74) *Attorney, Agent, or Firm* — RosserIP, LLC; Roy Rosser

(57) ABSTRACT

A simple, cost effective system and method for flexibly managing heat pump source fluid is disclosed. The source fluid flow-manager significantly enhances heat pump efficiency by selectively coupling it to renewable energy resources via geothermal, solar, and ambient air thermal exchanges. The sophisticated interconnection of these thermal exchanges also reduces installation costs. A preferred embodiment of the source fluid flow-manager consists of three T-port valves, two pumps and a plurality of connection points, and operates in at least twelve modes. These modes selectively interconnect source fluid flow between fluid utilizing units, such as heat pumps, and a variety of thermal exchange and/or storage units, such as hot or cold underground thermal storage-and-exchange regions, dry coolers and solar thermal collectors. The valves and pumps are controlled by a programmed controller, guided by input from flow meters and thermometers. Operational modes are matched to thermal need, and to system and environmental status.

4 Claims, 6 Drawing Sheets

Related U.S. Application Data

(60) Provisional application No. 63/041,810, filed on Jun. 19, 2020, provisional application No. 62/969,441, filed on Feb. 3, 2020, provisional application No. 62/909,607, filed on Oct. 2, 2019.

(51) Int. Cl.
  *G05D 7/06* (2006.01)
  *F25B 27/00* (2006.01)

(56) References Cited

U.S. PATENT DOCUMENTS

| | | |
|---|---|---|
| 5,461,876 A | 10/1995 | Dressler |
| 8,701,432 B1 | 4/2014 | Olson |
| 8,726,682 B1 | 5/2014 | Olson |
| 2009/0019876 A1* | 1/2009 | Guglietti ............... F24F 5/0046 62/260 |
| 2011/0272117 A1* | 11/2011 | Hamstra ................. F28D 20/00 165/45 |
| 2012/0180984 A1* | 7/2012 | Fujitsuka ............. F25B 25/005 165/61 |
| 2020/0109861 A1 | 4/2020 | Olson |

OTHER PUBLICATIONS

"Hybrid ground-source heat pump system with active regeneration" published by K. Allaerts et al. published in "Energy Conversion and Management" vol. 90, Jan. 15, 2015, pp. 230-237.
"An analysis of solar assisted ground source heat pumps in cold climates" published by Giuseppe Emmi et al. in "Energy Conversion and Management", vol. 106, Dec. 2015, pp. 660-675.

\* cited by examiner

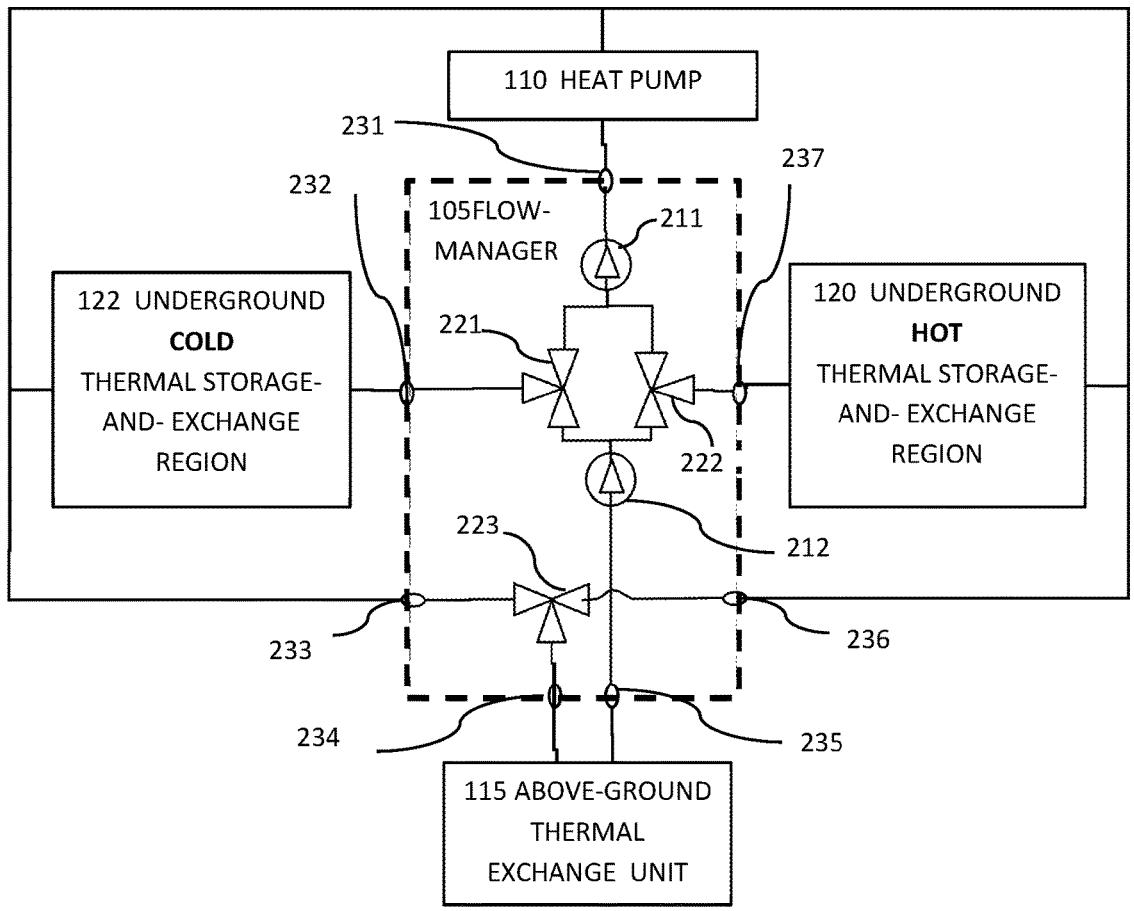

FIG. 5 A

| MODE | 221 V1 | 222 V2 | 223 V3 | 211 P1 | 212 P2 | Principal Use |
|---|---|---|---|---|---|---|
| 1: ABOVE-GROUND EXCHANGE MODE | 3 | 3 | 1 | ON | ON | Summer: Cooling/ Winter:Heating |
| 2: COLD UNDERGROUND SOURCE MODE | 2 | 2 | 4 | ON | OFF | Summer: Cooling |
| 3: HOT UNDERGROUND SOURCE MODE | 4 | 4 | 2 | ON | OFF | Winter: Heating |
| 4: COLD PRECONDITIONING ONLY | 4 | 4 | 2 | OFF | ON | Cold night: Cold precondition |
| 5: HOT PRECONDITIONING ONLY | 2 | 2 | 4 | OFF | ON | Hot day: Hot precondition |
| 6: HOT SUPPLY/COLD PRECONDITION | 4 | 4 | 2 | ON | ON | Winter day: Heating/cold precondition |
| 7: COLD SUPPLY/HOT PRECONDITION | 2 | 2 | 4 | ON | ON | Summer day: Cooling/hot precondition |
| 8: PARALLEL HOT/ABOVE-GROUND | 3 | 4 | 2 | ON | ON | Winter day: Heating |
| 9: PARALLEL COLD/ABOVE-GROUND | 2 | 3 | 4 | ON | ON | Summer day: Cooling |

FIG. 5 B

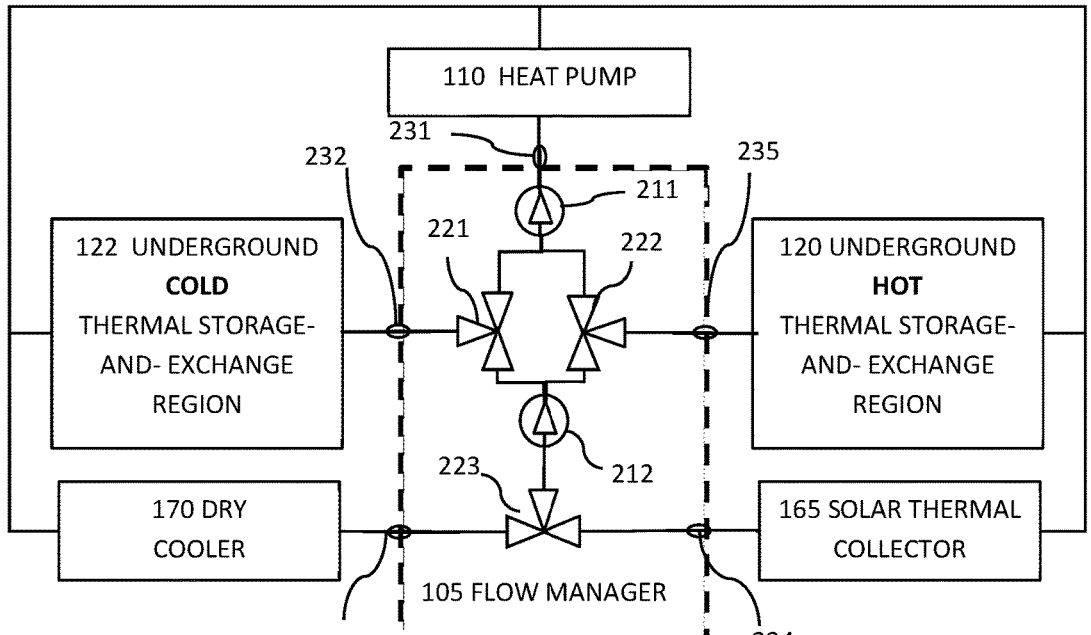

FIG. 6 A

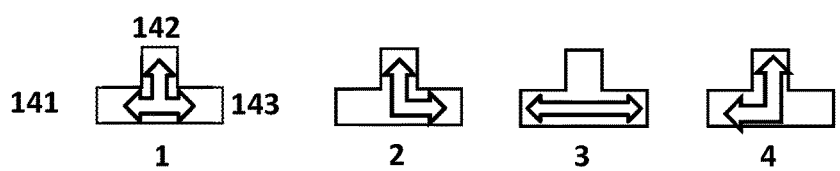

FIG. 6 B

| MODE | 221 V1 | 222 V2 | 223 V3 | 211 P1 | 212 P2 | Principal Use |
|---|---|---|---|---|---|---|
| 1: DRY COOLER MODE | 3 | 3 | 4 | ON | ON | Summer: Cooling / Winter Heating |
| 2: SOLAR THERMAL MODE | 3 | 3 | 2 | ON | ON | Winter heating |
| 3: COLD UNDERGROUND SOURCE MODE | 2 | 2 | 2 | ON | OFF | Summer: Cooling |
| 4: HOT UNDERGROUND SOURCE MODE | 4 | 4 | 4 | ON | OFF | Winter: Heating |
| 5: COLD UG PRECONDITIONING ONLY | 4 | 4 | 4 | OFF | ON | Cold night: Cold precondition |
| 6: HOT UG PRECONDITIONING ONLY | 2 | 2 | 2 | OFF | ON | Hot day: Hot precondition |
| 7: HOT UG SUPPLY/COLD UG PRECONDITION | 4 | 4 | 4 | ON | ON | Winter days Heating/ Cold precondition |
| 8: COLD UG SUPPLY/HOT UG PRECONDITION | 2 | 2 | 2 | ON | ON | Summer day: Cooling/Hot precondition |
| 9: PARALLEL SUPPLY HOT UG /DRY COOLER | 3 | 2 | 4 | ON | ON | Winter: Heating |
| 10: PARALLEL SUPPLY COLD UG/DRY COOLER | 2 | 3 | 4 | ON | ON | Summer: Cooling |
| 11: PARALLEL SUPPLY HOT UG /SOLAR THERMAL | 3 | 4 | 2 | ON | ON | Winter days: Heating |
| 12: PARALLEL SUPPLY COLD UG/SOLAR THERMAL | 2 | 3 | 2 | ON | ON | End of winter: Hot UG exhausted |

FIG. 6 C

SYSTEM AND METHOD FOR MANAGING SOURCE FLUID

CROSS-REFERENCE TO RELATED APPLICATIONS

This application is a continuation-in-part application of U.S. Ser. No. 16/592,538 entitled "System and Method for Providing Usable Source Fluid" filed on Oct. 3, 2019 by Gaylord Olson, and also claims priory to provisional application U.S. 63/041,810 entitled "System and Method for Managing Source Fluid", filed on Jun. 19, 2020 by Gaylord Olson, to provisional patent application U.S. 62/969,441 entitled "Valve and Pump Arrays for Multi-Source Heat Pump Systems" filed on Feb. 3, 2020 by Gaylord Olson, and to provisional patent application U.S. 62/909,607 entitled "System for Circulating Heat Pump Source Fluid" filed on Oct. 2, 2019 by Gaylord Olson, the contents of all of which are hereby fully incorporated by reference.

BACKGROUND OF THE INVENTION

(1) Field of the Invention

The invention relates to systems and methods for managing the flow of source fluid, and particularly for managing the flow of source fluid as it is transferred from thermal sources and storage units to thermal sinks and other elements for purposes including heating, cooling and preconditioning, and more particularly for managing the flow of source fluid between such elements using cost effective assemblies of fluid control elements, typically water pumps, valves, and heat pumps, to provide flexible fluid management.

(2) Description of Related Art

The technical problem of providing efficient, cost effective thermal exchange systems for the heating or cooling of buildings is inherent in the technical field of mechanical engineering for indoor and vehicular comfort. Finding solutions to the problem is made particularly urgent by the threat of global climate change that appears to be driven largely by greenhouse gas emissions, particularly $CO_2$ gas released by the burning of fossil fuels.

Electrical heat pumps currently represents the most promising technology to reduce fossil fuel usage, and may, for instance, be used to heat or cool homes, offices and other buildings. The heat pump utilizes a refrigeration cycle, i.e., the compression and expansion of a refrigerant, to transfer heat to, or from, the space being heated, or cooled, to a source, or sink, of heat.

Heat pump efficiency may be considerably enhanced by adapting them to exploit renewable energy resources by, for instance, combining them with above-ground thermal exchange units such as, but not limited to, dry coolers and solar thermal collectors, and/or to underground thermal storage-and-exchange regions. However, incorporating these renewable energy units typically introduces significant initial capital costs. Geothermal energy in particular requires drilling bore fields which may be expensive. To reduce these costs, proposals have been made as to how to combine these technologies most effectively and cost efficiently. K. Allaerts et al. have, for instance, in the prior art listed below, shown that the cost of drilling the bore fields necessary to augment dry cooler technology with renewable geothermal sources may be reduced by as much as 47% by splitting the bore field into a hot and a cold region, and using a dry cooler to precondition them. Similarly, G. Emmi et al. have, in the prior art listed below, shown that a solar assisted geothermal heating solution allows for a roughly 50% reduction in the size of the required bore fields, similarly significantly reducing the upfront drilling costs.

Further savings may be possible by even more sophisticated use of solar and ambient air assistance as detailed, for instance, by Olson in US patent publication US 2020/0109861, in which, for instance, dry coolers are implemented to provide source fluid directly to the heat pump, as well as to precondition hot and cold underground thermal storage and exchange regions that may themselves be harnessed directly to the heat pumps. However, such sophisticated solutions require complex management of the source fluid. The optimal path along which the source fluid needs to flow may change dependent on environmental and weather conditions that typically vary on an hourly, diurnal or annual basis.

What is needed to implement such a sophisticated use of solar and ambient air energy, both for direct heating and cooling, and to augment geothermal energy use by, for instance, appropriate preconditioning of geothermal regions, is a flexible but cost effective flow management system. In particular, what is needed is an innovative choice of pumps, valves and connection points to facilitate a flexible source fluid flow-manager that is cost effective and that may be used to manage the complex requirements of sophisticated combinations of solar/ambient air/geothermal assistance of heat pumps for both heating and cooling.

The relevant prior art includes:

An article entitled "An analysis of solar assisted ground source heat pumps in cold climates" published by Giuseppe Emmi et al. in "Energy Conversion and Management", Volume 106, December 2015, Pages 660-675, the contents of which are hereby incorporated by reference. This publication describes computer simulations carried out in six cold locations in order to investigate solar assisted ground source heat pumps. The effect of the borehole length on the energy efficiency of the heat pump was, in particular, analyzed. Additionally, a suitable control strategy to manage both the solar thermal collectors and the borehole heat exchangers is detailed, and its implementation documented.

An article entitled "Hybrid ground-source heat pump system with active regeneration" published by K. Allaerts et al. published in "Energy Conversion and Management" Volume 90, 15 Jan. 2015, Pages 230-237, the contents of which are hereby incorporated by reference, describes an analysis of a hybrid ground-source heat pump system in which the bore field is split into a warm part and a cold part, which allows for seasonal thermal-energy storage. The article also describes how supplementary dry coolers may capture heat during summer and cold during winter.

US Patent Application 2020/0109861 submitted by G. Olson and published on Apr. 9, 2020 entitled "System and Method for Providing Useable Source Fluid", the contents of which are hereby incorporated by reference, that describes a system and method for providing useable source fluid from a thermal exchange unit and/or one or more thermal exchange and storage units. The application also describes topologies that allow operation in a variety of modes, including an air source, a ground source, a preconditioning, a parallel and a simultaneous mode. In the air source mode conditioned source fluid is obtained exclusively from an air-to-liquid heat exchanger. In the ground source mode source fluid is obtained exclusively from a ground heat exchanger. In the preconditioning mode source fluid from the air-to-liquid heat exchanger is used to condition a ground heat exchanger. In the parallel mode source fluid is obtained from both the air-to-liquid heat exchanger and a ground heat exchanger. In the simultaneous mode, source fluid from the air-to-liquid heat exchanger is used to improve the thermal condition of a ground heat exchanger while source fluid for the heat pump is obtained from another ground heat exchanger.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method for managing heat pump source fluid is disclosed. The source fluid flow-manager may be a compact module that may include a selection of source fluid pumps and valves that allow for flexible direction of fluid flow to and from a number of fixed connection points in order to accomplish various modes of operation.

In a preferred embodiment, the source fluid flow-manager may include three T-port valves, two source fluid pumps and have seven connection points. Such an arrangement may, for instance, be capable of operation in nine modes, and may, for instance, be used to selectively interconnect source fluid flow between a fluid utilizing unit, such as a heat pump, a hot and a cold underground thermal storage-and-exchange region, and an above-ground thermal exchange unit, such as, but not limited to, a dry cooler or a solar thermal collector. These modes of operation, and the requisite valve and pump settings are described in detail below. The control of the valves and pumps may be accomplished by, for instance, using suitable electronic or pneumatic actuators that may be controlled by a suitably programmed digital or analogue electronic controller. The system may also be monitored by suitably placed flow meters and thermometers. The results of the monitoring may, for instance, be used by the electronic controller to select the appropriate mode of operation given the current thermal need and current system and environmental status.

In a further preferred embodiment, the source fluid flow-manager may include three T-port valves, two source fluid pumps and have eight connection points. Such an arrangement may, for instance, be capable of operation in twelve modes. These modes may, for instance, be used to selectively interconnect source fluid flow between a fluid utilizing unit, such as a heat pump and one or more thermal exchange units. The thermal exchange units may, for instance, be below ground thermal storage and exchange units such as, but not limited to, a hot and a cold underground thermal storage-and-exchange region, or they may be above-ground thermal exchange units, such as, but not limited to, a dry cooler or a solar thermal collector. The source fluid flow-manager may also selectively interconnect source fluid flow between the above-ground thermal exchange units and the below ground thermal storage and exchange regions for purposes such as, but not limited to, preconditioning of such regions.

Therefore, the present invention succeeds in conferring the following, and other not mentioned, desirable and useful benefits and objectives.

It is an object of the present invention to provide a simple, cost effective source-fluid manager that may be used to selectively provide appropriate modes of operation for the complex requirements of sophisticated combinations of solar/ambient air/geothermal assistance of heat pumps for both heating and cooling.

BRIEF DESCRIPTION OF THE SEVERAL VIEWS OF THE DRAWINGS

FIG. 5A shows a schematic view of a source fluid flow-manager of the present invention that flexibly manages the use of source fluid between an above-ground thermal exchange unit, an underground hot thermal storage-and-exchange region, an underground cold thermal storage-and-exchange region, and a heat pump.

FIG. 5B shows, in tabular format, the settings of the T-port valves and source fluid pumps required to select the various modes of operation of the source fluid flow-manager depicted in FIG. 5A.

FIG. 6A shows a schematic view of a source fluid flow-manager of the present invention that flexibly manages the use of source fluid between a dry cooler, a solar thermal collector, an underground hot thermal storage-and-exchange region, an underground cold thermal storage-and-exchange region, and a heat pump.

FIG. 6B shows a schematic view of four settings of a T-port valve.

FIG. 6C shows, in tabular format, the settings of the T-port valves and source fluid pumps required to select the various modes of operation of the source fluid flow-manager of FIG. 6A.

DETAILED DESCRIPTION OF THE INVENTION

Figure 1:
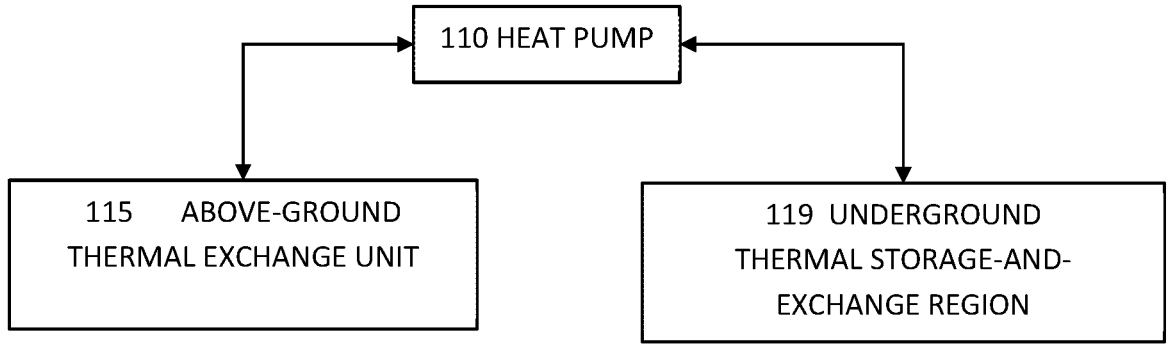
FIG. 1 shows a schematic, prior art, arrangement for providing source fluid to a heat pump from an above-ground thermal exchange unit and an underground hot thermal storage-and-exchange region.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic, prior art, arrangement for providing source fluid to a heat pump 110 from an above-ground thermal exchange unit 115 and an underground thermal storage-and-exchange region 119. Such a system is described in detail in, for instance, the article entitled "An analysis of solar assisted ground source heat pumps in cold climates" published by G. Emmi et al. in "Energy Conversion and Management", Volume 106, December 2015, pages 660-675, the contents of which are hereby incorporated by reference. As discussed in the article, such a solar assisted geothermal heating solution allows for a roughly 50% reduction in the size of the required bore fields, allowing for significantly reduced upfront drilling costs when implementing the system.

Figure 2:
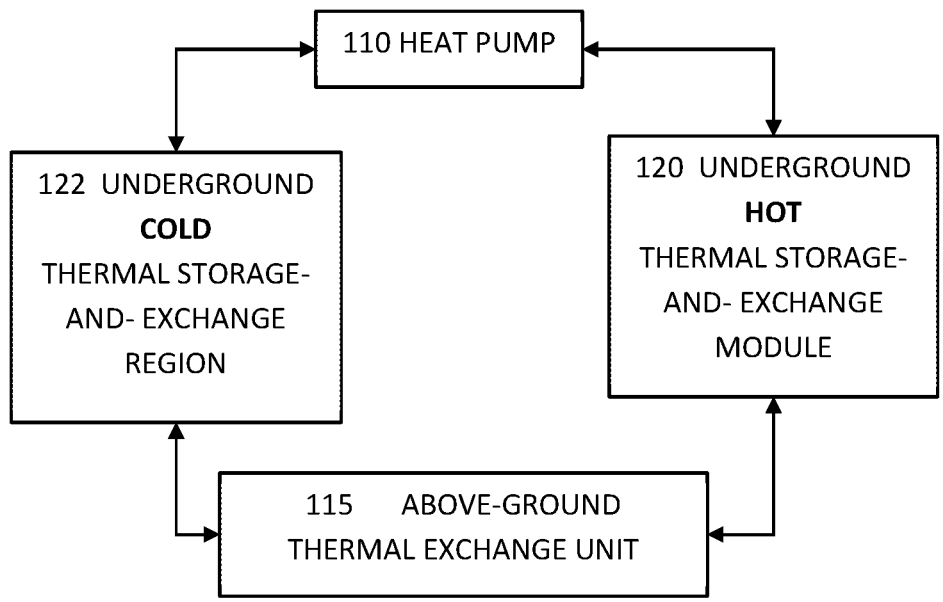
FIG. 2 shows a schematic, prior art, arrangement for providing source fluid to a heat pump from either a hot or a cold underground thermal storage-and-exchange region, and for preconditioning those regions by means of an above-ground thermal exchange unit.

FIG. 2 shows a schematic, prior art arrangement for providing source fluid to a heat pump 110 from either a hot or a cold underground thermal storage-and-exchange region 122 or 120, and for preconditioning those regions by means of an above-ground thermal exchange unit 115, such as, but not limited to, a dry cooler or a solar collector. Such a system has been described in detail in an article entitled "Hybrid ground-source heat pump system with active regeneration" published by K. Allaerts et al. in "Energy Conversion and Management" Volume 90, 15 Jan. 2015, Pages 230-237, the contents of which are hereby incorporated by reference. As detailed in the article, by splitting the bore field into a hot and a cold region, and using a dry cooler to precondition them, the cost of drilling the necessary bore fields may be reduced by as much as 47%.

Figure 3:
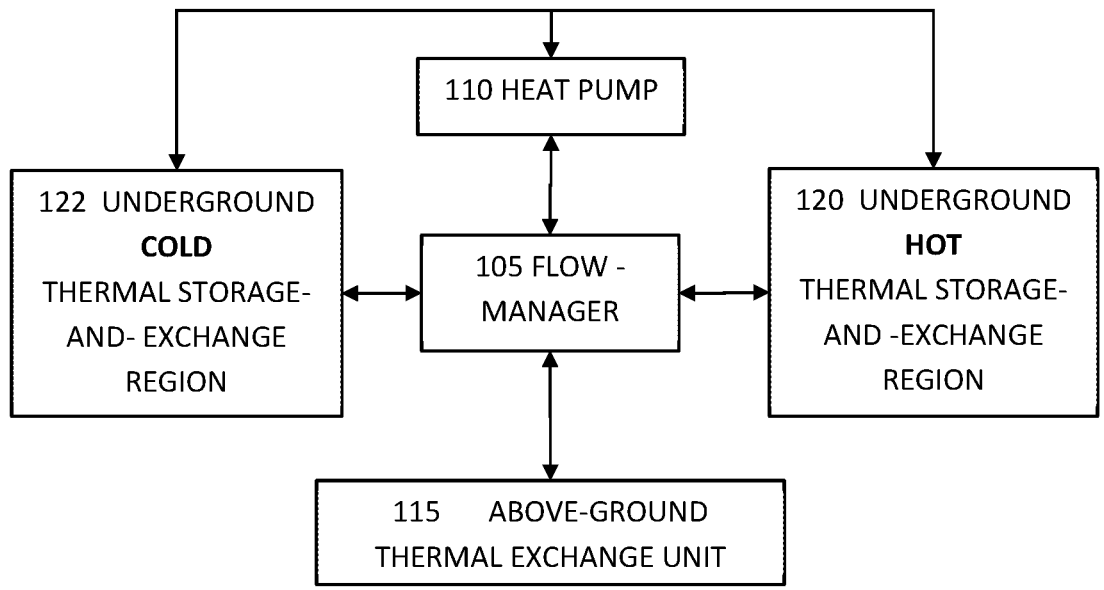
FIG. 3 shows a schematic view of a source fluid flow-manager of the present invention managing flow among an underground cold thermal storage-and-exchange region, an underground hot thermal storage-and-exchange region, an above-ground thermal exchange unit, and a source fluid utilizing unit.

FIG. 3 shows a schematic view of a source fluid flow-manager 105 of the present invention designed to control flow among an underground cold thermal storage-and-exchange region 122, an underground hot thermal storage-and-exchange region 120, an above-ground thermal exchange unit 115, and a source fluid utilizing unit that may be a heat pump 110.

With such a source fluid flow-manager 105, this embodiment of the present invention may afford all the advantages of geothermal augmentation of heat pump systems detailed above in the systems presented by both G. Emmi et al. and K. Allaerts et al., as detailed above. The source fluid flow-manager 105 of the present invention, utilized to manage source fluid among the configuration of thermal storage, usage and generation depicted in FIG. 3 may, therefore, result in cost savings in system installation of as much as 60% over the more conventional ways in which geothermal storage and exchange units are used to enhance heat pump efficiency.

Figure 4:
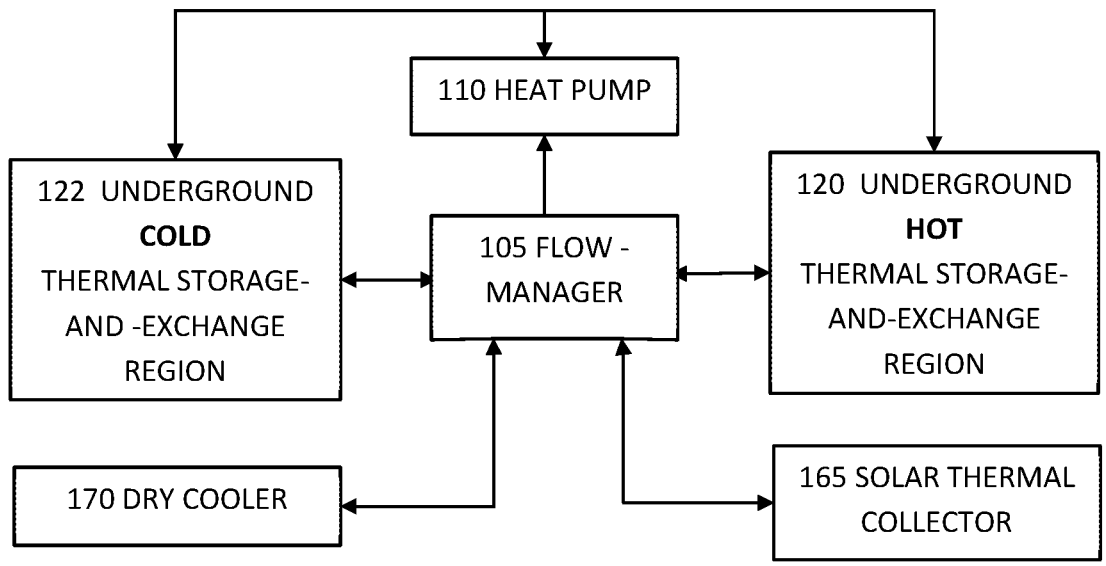
FIG. 4 shows a schematic view of a source fluid flow-manager of the present invention managing flow among an underground cold thermal storage-and-exchange region, an underground hot thermal storage-and-exchange region, a dry cooler, a solar thermal collector, and a source fluid utilizing unit.

FIG. 4 shows a schematic view of a source fluid flow-manager 105 of the present invention managing flow among an underground cold thermal storage-and-exchange region 122, an underground hot thermal storage-and-exchange region 120, a dry cooler 170, a solar thermal collector 165, and a source utilizing unit, that may be a heat pump 110.

With such a source fluid flow-manager 105, this embodiment of the present invention may extend the advantages of geothermal augmentation of heat pump systems to include augmentation by solar thermal and ambient thermal collectors. This may allow both for lower initial installation costs and for more efficient operation. The lower installation cost may, for instance, be realized because the drilling costs of the geothermal bore fields are significantly reduced. The more efficient operation may, for instance, be a result of providing additional modes of solar thermal and ambient air thermal augmentation, that may increase the efficacy of the heat pumps and thereby reduce operating costs.

FIG. 5A shows a schematic view of a source fluid flow-manager 105 of a preferred embodiment of the present invention that may flexibly manage the use of source fluid between an above-ground thermal exchange unit 115, an underground hot thermal storage-and-exchange region 120, an underground cold thermal storage-and-exchange region 122, and a heat pump 110.

As shown in FIG. 5A, a first source fluid pump 211 may be connected to a first connection point 231, a first T-port valve 221 is connected by its second port to a second connection point 232, a third T-port valve 223 is connected via its third port to a third connection point 233, by its second port to a fourth connection point 234 and by its first port to a sixth connection point 236, while a second source fluid pump 212 may be connected to a fifth connection point 235, and a second T-port valve 222 is connected via its second port to a seventh connection point 237.

FIG. 5B shows, in tabular format, the settings of the T-port valves and source fluid pumps required to select the various modes of operation of the source fluid flow-manager depicted in FIG. 5A.

For instance, nine modes of operation may be selected in the following manner:

In a first mode of operation, which may be termed an above ground exchange mode, the valves of the flow manager may set such that source fluid circulates out via the first connection point 231, in via the third connection point 233, out via the fourth connection point 234, and in via the fifth connection point 235. This may, for instance, be accomplished by having the first T-port valve 221 set to conduct fluid between its first port and its third port, the second T-port valve 222 set to conduct fluid between its first port and its third port, the third T-port valve 223 set to conduct fluid between all three of its ports, while both the first source fluid pump 211 and the second source fluid pump 212 are operational. With the appropriate external connections, as shown in FIG. 5A, in this mode of operation, source fluid may circulate exclusively from the above-ground thermal exchange unit to the source fluid utilizing module, that may be a heat pump 110. Such a mode may, for instance, be used during summer for cooling, and in winter for heating.

In a second mode of operation, that may be termed an underground cold source mode, the values of said flow manager may be set such that source fluid circulates exclusively out via the first connection point and in via the second connection point. This may, for instance, be accomplished by having the first T-port valve 221 set to conduct fluid between its second port and its third port, the second T-port valve 222 set to conduct fluid between its second port and its third port, the third T-port valve is set to conduct fluid between its first port and its second port, while the first source fluid pump 211 is operational, but the second source fluid pump is not operational. With the appropriate external connections, as shown in FIG. 5A, in this mode of operation, source fluid may circulate exclusively from the cold thermal storage and exchange unit to the source utilizing module. Such a mode may, for instance, be used in summer for cooling.

In a third mode of operation, which may be termed a hot underground source mode, the valves and pumps of said flow manager may be set such that source fluid circulates exclusively out via the first connection point and in via the seventh connection point. This may, for instance, be accomplished by having the first T-port valve 221 set to conduct fluid between its first port and its second port, the second T-port valve 222 set to conduct fluid between its first port and its second port, the third T-port valve set to conduct fluid between its second port and its third port, while the first source fluid pump 211 is operational, but the second source fluid pump 212 is not operational. With the appropriate external connections, as shown in FIG. 5A, in this mode of operation, source fluid may circulate exclusively from the hot thermal storage and exchange unit to the source utilizing module. Such a mode may, for instance, be used in winter for heating.

In a fourth mode of operation 134, that may be termed a cold preconditioning mode only, the valves of the flow manager may be set such that source fluid circulates out via the second connection point, in via the third connection point 233, out via said fourth connection point and in via said fifth connection point. This may, for instance, be accomplished by having the first T-port valve 221 set to conduct fluid between its first port and its second port, the second T-port valve 222 set to conduct fluid between its first port and its second port, the third T-port valve set to conduct fluid between its second port and its third port, while first source fluid pump 211 is not operational, but second source fluid pump 212 is operational. With the appropriate external connections, as shown in FIG. 5A, in this mode of operation, source fluid may circulate exclusively from the above-ground thermal exchange unit to the cold thermal storage and exchange unit. Such a mode may, for instance, be used on cold nights for preconditioning the underground cold, thermal storage-and-exchange region.

In a fifth mode of operation 135, that may be termed a hot preconditioning only mode, the valves of the flow manager may be set such that source fluid circulates out via the seventh connection point and in via the sixth connection point, out via the fourth connection point and in via the fifth connection point 235. This may, for instance, be accomplished by having the first T-port valve 221 set to conduct fluid between its second port and its third port, the second T-port valve 222 is set to conduct fluid between its second port and its third port, the third T-port valve set to conduct fluid between its first port and its second port, while the first source fluid pump 211 is not operational, but the second source fluid pump 212 is operational. With the appropriate external connections, as shown in FIG. 5A, in this mode of operation, source fluid may circulate exclusively from the above-ground thermal exchange unit to the hot thermal storage and exchange unit. Such a mode may, for instance, be used on a hot day for preconditioning the underground hot, thermal storage-and-exchange region.

In a sixth mode of operation 136, that may be termed the hot supply, cold precondition mode, the valves of said flow manager are set such that source fluid circulates out via the first connection point and in via the seventh connection point, out via the second connection point, in via the third connection point, out via the fourth connection point and in via the fifth connection point. This may, for instance, be accomplished by having the first T-port valve 221 set to conduct fluid between its first port and its second port, the second T-port valve 222 set to conduct fluid between its first port and its second port, the third T-port valve set to conduct fluid between its second port and its third port, while the first source fluid pump 211 is operational, and the second source fluid pump 212 is also operational. With the appropriate external connections, as shown in FIG. 5A, in this mode of operation, source fluid may circulate from the hot thermal storage and exchange unit to the source fluid utilizing module, while source fluid also circulates from the above-ground thermal exchange unit to the cold thermal storage and exchange unit. Such a mode may, for instance, be used on a winter day for heating via a heat pump, while simultaneously preconditioning the underground cold, thermal storage-and-exchange region.

In a seventh mode of operation 137, that may be termed the cold supply, hot precondition mode, the valves of the flow manager may be set such that source fluid circulates out via the first connection point and in via the second connection point, out via the seventh connection point, in via the sixth connection point 236, out via the fourth connection point and in via the fifth connection point. This may, for instance, be accomplished by having the first T-port valve 221 set to conduct fluid between a second port and a third port, the second T-port valve 222 set to conduct fluid between its second port and its third port, the third T-port valve set to conduct fluid between its first port and its second port, while both the first source fluid pump 211 and the second source fluid pump 212 are operational. With the appropriate external connections, as shown in FIG. 5A, in this mode of operation, source fluid may circulate from the cold thermal storage and exchange unit to the source fluid utilizing module, while source fluid also circulates from the above-ground thermal exchange unit to the hot thermal storage and exchange unit. Such a mode may, for instance, be used on summer day for cooling via a heat pump while simultaneously preconditioning a underground hot, thermal storage-and-exchange region.

In an eighth mode of operation 138, which may be termed a parallel hot/above ground mode, the valves of said flow manager may be set such that source fluid circulates out via the first connection point and in via the seventh connection point, in via the third connection point, out via the fourth connection point and in via the fifth connection point. This may, for instance, be accomplished by having the first T-port valve 221 set to conduct fluid between its first port and its third port, the second T-port valve 222 set to conduct fluid between its first port and its second port, the third T-port valve set to conduct fluid between its second port and its third port, while both the first source fluid pump 211 and said second source fluid pump 212 are operational. With the appropriate external connections, as shown in FIG. 5A, in this mode of operation, source fluid may circulate from both the hot thermal storage and exchange unit and the above-ground thermal exchange unit to the source fluid utilizing module. Such a mode may, for instance, be used on a winter day for heating via a heat pump.

In a ninth mode of operation 139, that may be termed the parallel cold/above ground mode, the valves of the flow manager may be set such that source fluid circulates out via the first connection point and in via the second connection point, in via the sixth connection point, out via the fourth connection point and in via the fifth connection point. This may, for instance, be accomplished by having the first T-port valve 221 set to conduct fluid between its second port and its third port, the second T-port valve 222 set to conduct fluid between its first port and its third port, the third T-port valve set to conduct fluid between its first port and its second port, while both the first source fluid pump 211 and the second source fluid pump 212 are operational. With the appropriate external connections, as shown in FIG. 5A, in this mode of operation, source fluid may circulate from both the cold thermal storage and exchange unit and the above-ground thermal exchange unit to the source fluid utilizing module. Such a mode may, for instance, be used on a summer day for cooling via a heat pump.

FIG. 6A shows a schematic view of a source fluid flow-manager 105 of the present invention that flexibly manages the use of source fluid between a dry cooler 170, a solar thermal collector 165, an underground hot thermal storage-and-exchange region 120, an underground cold thermal storage-and-exchange region 122, and a heat pump 110.

As shown in FIG. 6A, the source fluid flow-manager 105 may include a first source fluid pump 211 connected to a first connection point 231, a first T-port valve 221 connected via its second port to a second connection point 232, a third T-port valve 223 connected via its first port to a third connection point 233 and by its third port to a fourth connection point 234, and a second T-port valve 222 connected via its second port to a fifth connection point 235.

FIG. 6B shows a schematic view of four settings of a T-port valve.

FIG. 6C shows, in tabular format, the settings of the T-port valves and source fluid pumps required to select the various modes of operation of the source fluid flow-manager of FIG. 6A. As shown in FIG. 6C, there may be twelve modes of operation that the source fluid flow-manager 105 is capable of operating in.

In a first mode of operation, which may be termed a dry cooler mode, the valves of the flow manager may set such that source fluid circulates exclusively out via the first connection point 231, and in via the third connection point 233. This may, for instance, be accomplished by having the first T-port valve 221 set to conduct fluid between its first port and its third port, the second T-port valve 222 set to conduct fluid between its first port and its third port, the third T-port valve set to conduct fluid between its first port and its second port, while both the first source fluid pump 211 and the second source fluid pump 212 are operational. With the appropriate external connections, as shown in FIG. 6A, in this mode of operation, source fluid may circulate exclusively from the above-ground thermal exchange unit to the heat pump 110. Such a mode may, for instance, be used in summer for cooling and in winter for heating.

In a second mode of operation, that may be termed a solar thermal mode, the valves of said flow manager may be set such that source fluid circulates exclusively out via the first connection point 231, and in via the fourth connection point 234. This may, for instance, be accomplished by having the first T-port valve 221 is set to conduct fluid between its first port and its third port, the second T-port valve 222 set to conduct fluid between its first port and its third port, the third T-port valve set to conduct fluid between its second port and its third port, while both the first source fluid pump 211 and the second source fluid pump 212 are operational. With the appropriate external connections, as shown in FIG. 6A, in this mode of operation, source fluid may circulate exclusively from the solar thermal collector 165 to the heat pump 110. Such a mode may, for instance, be used in winter for heating.

In a third mode of operation, that may be termed a cold, underground source mode, the valves of the flow manager may be set such that source fluid circulates exclusively out via the first connection point 231, and in via the second connection point 232. This may, for instance, be accomplished by having the first T-port valve 221 set to conduct fluid between its second port and its third port, the second T-port valve 222 set to conduct fluid between its second port and its third port, the third T-port valve set to conduct fluid between its second port and its third port, while the first source fluid pump 211 is operational, but the second source fluid pump 212 is not operational. With the appropriate external connections, as shown in FIG. 6A, in this mode of operation, source fluid may circulate exclusively from the underground cold, thermal storage-and-exchange region 122 to the heat pump 110. Such a mode may, for instance, be used in summer for cooling.

In a fourth mode of operation, that may be termed a hot underground source only mode, the valves of said flow manager may be set such that source fluid circulates exclusively in via the fifth connection point 235, and out via the first connection point 231. This may, for instance, be accomplished by having the first T-port valve 221 set to conduct fluid between its first port and its second port, the second T-port valve 222 set to conduct fluid between its first port and its second port, the third T-port valve set to conduct fluid between its first port and its second port, while the first source fluid pump 211 is operational, but the second source fluid pump 212 is not operational. With the appropriate external connections, as shown in FIG. 6A, in this mode of operation, source fluid may circulate exclusively from the underground hot, thermal storage-and-exchange region 120 to the heat pump 110. Such a mode may, for instance, be used in winter for heating.

In a fifth mode of operation, that may be termed a cold underground preconditioning mode, the valves of said flow manager may be set such that source fluid circulates in via the third connection point 233, and out via the second connection point 232. This may, for instance, be accomplished by having the first T-port valve 221 set to conduct fluid between its first port and its second port, the second T-port valve 222 set to conduct fluid between its first port and its second port, the third T-port valve set to conduct fluid between its first port and its second port, while the first source fluid pump 211 is not operational, but the second source fluid pump 212 is operational. With the appropriate external connections, as shown in FIG. 6A, in this mode of operation, source fluid may circulate exclusively from the dry cooler 170 to the underground cold, thermal storage-and-exchange region 122. Such a mode may, for instance, be used on a cold night for preconditioning the underground cold, thermal storage-and-exchange region.

In a sixth mode of operation, which may be termed a hot underground preconditioning only mode, the valves of said flow manager may be set such that source fluid circulates exclusively in via the third connection point 233, and out via the fifth connection point 235. This may, for instance, be accomplished by having the first T-port valve 221 set to conduct fluid between its second port and its third port, the second T-port valve 222 set to conduct fluid between its second port and its third port, the third T-port valve set to conduct fluid between its second port and its third port, while the first source fluid pump 211 is not operational, but the second source fluid pump 212 is operational. With the appropriate external connections, as shown in FIG. 6A, in this mode of operation, source fluid may circulate exclusively from the solar thermal collector 165 to the underground hot, thermal storage-and-exchange region 120. Such a mode may, for instance, be used on a hot day for preconditioning the underground hot, thermal storage-and-exchange region.

In a seventh mode of operation, which may be termed a hot underground supply/cold underground preconditioning mode, the valves of the flow manager may be set such that source fluid circulates out via the first connection point 231, and in via the fifth connection point 235, and out via the second connection point 232 and in via the third connection point 233. This may, for instance, be accomplished by having the first T-port valve 221 set to conduct fluid between its first port and its second port, the second T-port valve 222 set to conduct fluid between its first port and its second port, the third T-port valve set to conduct fluid between its first port and its second port, while both the first source fluid pump 211 and the second source fluid pump 212 are operational. With the appropriate external connections, as shown in FIG. 6A, in this mode of operation, source fluid may circulate from the hot thermal storage and exchange unit 120 to the heat pump 110, and from the dry cooler 170 to the underground cold, thermal storage-and-exchange region 122. Such a mode may, for instance, be used on a winter day for heating via the heat pump 110 while simultaneously preconditioning the underground cold, thermal storage-and-exchange region.

In an eighth mode of operation, that may be termed a cold underground supply, hot preconditioning mode, the valves of said flow manager may be set such that source fluid circulates in via the second connection point 232, and out via the first connection point 231, and in via the fourth connection point 234 and out via the fifth connection point 235. This may, for instance, be accomplished by having the first T-port valve 221 set to conduct fluid between its second port and its third port, the second T-port valve 222 set to conduct fluid between its second port and its third port, the third T-port valve set to conduct fluid between its second port and its third port, while both the first source fluid pump 211 and the second source fluid pump 212 are operational. With the appropriate external connections, as shown in FIG. 6A, in this mode of operation, source fluid may circulate from the underground cold, thermal storage-and-exchange region 122 to the heat pump 110, and from the solar thermal collector 165 to the underground hot, thermal storage-and-exchange region 120. Such a mode may, for instance, be used on a summer day for cooling via a heat pump while simultaneously preconditioning a underground hot, thermal storage-and-exchange region.

In a ninth mode of operation, which may be termed a parallel hot underground/dry cooler supply mode, the valves of the flow manager may be set such that source fluid circulates out via the first connection point 231, and in via the third connection point 233 and in via the fifth connection point 235. This may, for instance, be accomplished by having the first T-port valve 221 set to conduct fluid between its first port and its third port, the second T-port valve 222 set to conduct fluid between its second port and its third port, the third T-port valve set to conduct fluid between its first port and its second port, while both the first source fluid pump 211 the second source fluid pump 212 are operational. With the appropriate external connections, as shown in FIG. 6A, in this mode of operation, source fluid may circulate from both the underground hot, thermal storage-and-exchange region 120 and the dry cooler 170 to the heat pump 110. Such a mode may, for instance, be used in winter for heating.

In a tenth mode of operation 1310, that may be termed a parallel cold underground/dry cooler supply mode, the valves of the flow manager may be set such that source fluid circulates out via the first connection point 231, and in via the second connection point 232, and in via the third connection point 233. This may, for instance, be accomplished by having the first T-port valve 221 set to conduct fluid between a second port and a third port, the second T-port valve 222 set to conduct fluid between a first port and a third port, the third T-port valve set to conduct fluid between a first port and a second port, while both the first source fluid pump 211 and the second source fluid pump 212 are operational. With the appropriate external connections, as shown in FIG. 6A, in this mode of operation, source fluid may circulate both from the underground cold, thermal storage-and-exchange region 122 and the dry cooler 170 to the heat pump 110. Such a mode may, for instance, be used om summer for cooling.

In an eleventh mode of operation, that may be termed a parallel hot underground and solar thermal supply mode, the valves of the flow manager may be set such that source fluid circulates out via the first connection point 231, and in via the fourth connection point 234, and in via the fifth connection point 235. This may, for instance, be accomplished by having the first T-port valve 221 set to conduct fluid between its first port and its third port, the second T-port valve 222 set to conduct fluid between its first port and its second port, the third T-port valve set to conduct fluid between its second port and its third port, while both the first source fluid pump 211 and the second source fluid pump 212 are operational. With the appropriate external connections, as shown in FIG. 6A, in this mode of operation, source fluid may circulate both from the solar thermal collector 165 and the underground hot, thermal storage-and-exchange region 120 to the heat pump 110. Such a mode may, for instance, be used on winter days for heating.

In a twelfth mode of operation, that may be termed a parallel cold underground/solar thermal supply mode, the valves of the flow manager may be set such that source fluid circulates out via the first connection point 231, and in via the second connection point 232 and in via the fourth connection point 234. This may, for instance, be accomplished by having the first T-port valve 221 set to conduct fluid between its second port and its third port, the second T-port valve 222 set to conduct fluid between its first port and its third port, the third T-port valve set to conduct fluid between its second port and its third port, while both the first source fluid pump 211 and the second source fluid pump 212 are operational. With the appropriate external connections, as shown in FIG. 6A, in this mode of operation, source fluid may circulate both from the underground cold, thermal storage-and-exchange region 122 and the solar thermal collector 165 to heat pump 110. Such a mode may, for instance, be used toward the end of winter for heating when the underground hot, thermal storage-and-exchange region may have, through extensive use, become cooler the than the underground cold, thermal storage-and-exchange region.

Figure 7:
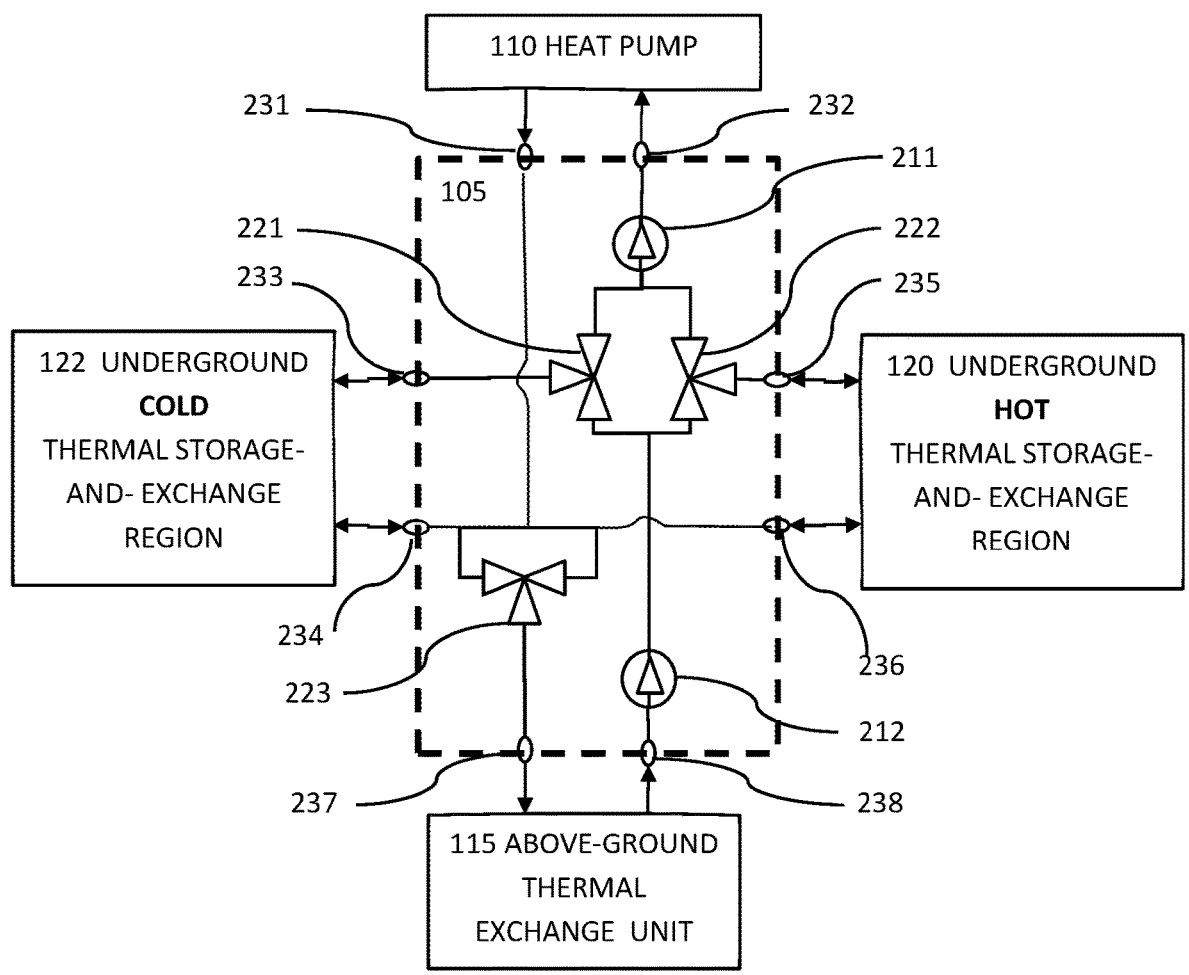
FIG. 7 shows a schematic view of a source fluid flow-manager of a further embodiment of the present invention that flexibly manages the use of source fluid between an above-ground thermal exchange unit, an underground hot thermal storage-and-exchange region, an underground cold thermal storage-and-exchange region, and a heat pump.

FIG. 7 shows a schematic view of a source fluid flow-manager 105 of a further embodiment of the present invention that flexibly manages the use of source fluid between an above-ground thermal exchange unit 115, an underground hot thermal storage-and-exchange region 120, an underground cold thermal storage-and-exchange region 122, and a heat pump 110.

The source fluid flow-manager 105 embodiment depicted in FIG. 7 has eight connection points, allowing it to manage the nine modes of operation detailed above in connection with the embodiment of FIG. 5A. An advantage of the FIG. 7 embodiment is that all necessary plumbing may be contained within the source fluid flow-manager.

As shown in FIG. 7, the first connection point 231 may be connected to both the fourth connection point 234 and the sixth connection point 236, as well as to the first and third ports of the third T-port valve 223. The second connection point 232 may be connected to the first source fluid pump 211, while the third connection point 233 may be connected to the second port of the first T-port valve 221. The fifth connection point 235 may be connected to the second port of the second T-port valve 222.

The embodiment of the source fluid flow-manager 105 shown in FIG. 7 may be used to make a heat pump 110 more efficient by connecting it to geothermal, ambient air, and/or solar thermal storage and exchange units as shown in FIG. 7. In FIG. 7, the heat pump 110 is connected to the source fluid flow-manager 105 via the second connection point 232 that allows source fluid to flow into the heat pump, and via the first connection point 231 that allows source fluid to flow out of the heat pump. An underground cold thermal storage-and-exchange region 122 is shown connected to the source fluid flow-manager 105 via the third connection point 233 and the fourth connection point 234. An underground hot thermal storage-and-exchange region 120 is shown connected to the source fluid flow-manager 105 via a fifth connection point 235 and a sixth connection point 236. An above-ground thermal exchange unit 115 is shown connected to the source fluid flow-manager 105 via a seventh connection point 237 and an eighth connection point 238.

Figure 8:
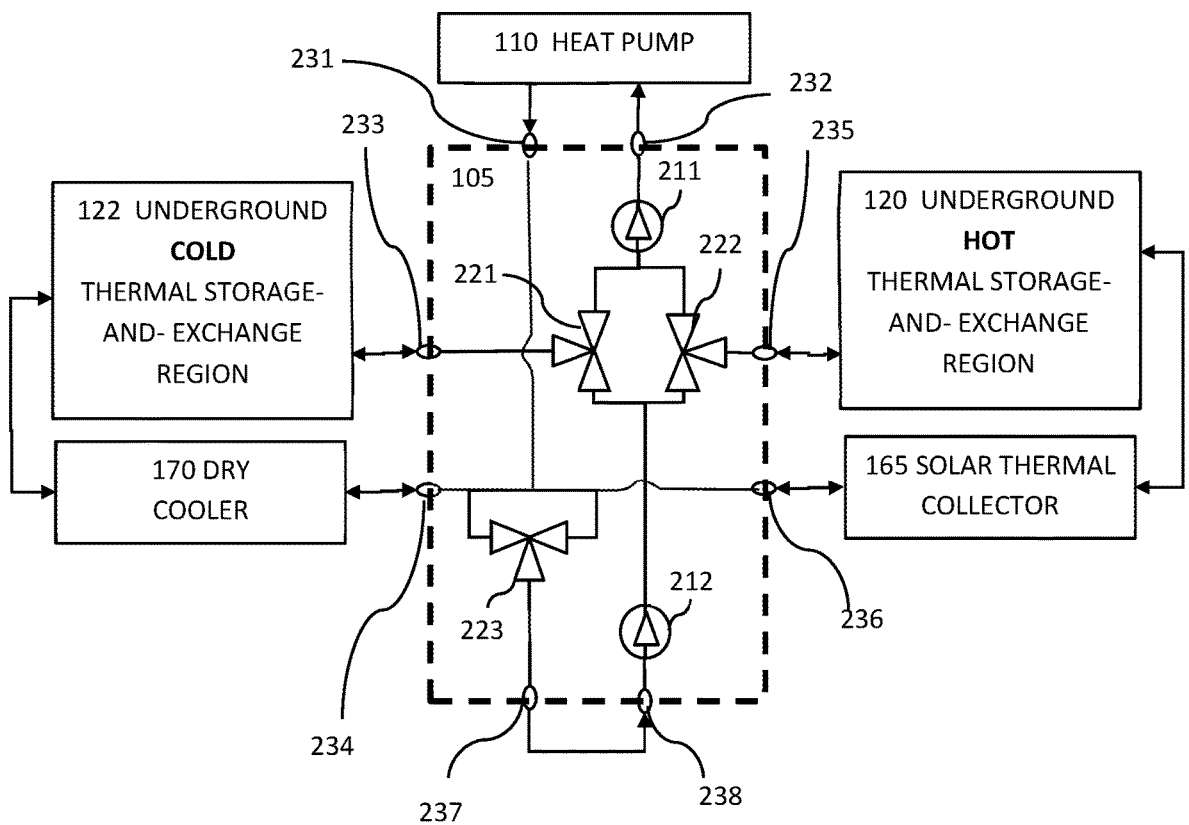
FIG. 8 shows a schematic view of a source fluid flow-manager of a further embodiment of the present invention that flexibly manages the use of source fluid between a dry cooler, a solar thermal collector, an underground hot thermal storage-and-exchange region, an underground cold thermal storage-and-exchange region, and a heat pump.

FIG. 8 shows a schematic view of a source fluid flow-manager 105 of a further embodiment of the present invention that flexibly manages the use of source fluid between a dry cooler 170, a solar thermal collector 165, an underground hot thermal storage-and-exchange region 120, an underground cold thermal storage-and-exchange region 122, and a heat pump 110.

The source fluid flow-manager 105 shown in FIG. 8 has eight connection points, and has three T-port valves and two source fluid pumps connected to have substantially the same functionality as the embodiment shown in FIG. 5. However, with a few external connections, the source fluid flow-manager 105 may provide the same twelve modes of operation as the source fluid flow-manager 105 shown and described above in connection with FIGS. 6A and 6C. This may, for instance, be accomplished by having the heat pump 110 connect to first and second connection points 231 or 232, while the underground cold thermal storage-and-exchange region 122 is connected via third connection point 233, the dry cooler 170 is connected via fourth connection point 234, the seventh and eighth connection points 237/238 are joined together, the solar thermal collector 165 is connected to the sixth connection point 236, and the underground hot thermal storage-and-exchange region 120 is connected to the fifth connection point 235.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A source fluid flow-manager, comprising:
two source fluid pumps;
three T-port valves;
seven connection points; and,
wherein, said fluid pumps and T-port valves are connected such that:
in a first mode of operation, the valves of said flow manager are set such that source fluid circulates out of said fluid flow-manager via a first connection point, into said fluid flow-manager via a third connection point, out of said fluid flow-manager via a fourth connection point, and into said fluid flow-manager via a fifth connection point;
in a second mode of operation, the valves of said flow manager are set such that source fluid circulates out of said fluid flow-manager exclusively via said first connection point and into said fluid flow-manager via a second connection point;
in a third mode of operation, the valves of said flow manager are set such that source fluid circulates out of said fluid flow-manager exclusively via said first connection point and into said fluid flow-manager via a seventh connection point;
in a fourth mode of operation, the valves of said flow manager are set such that source fluid circulates out of said fluid flow-manager via said second connection point, into said fluid flow-manager via said third connection point, out of said fluid flow-manager via said fourth connection point and into said fluid flow-manager via said fifth connection point;
in a fifth mode of operation, the valves of said flow manager are set such that source fluid circulates out of said fluid flow-manager via said seventh connection point and into said fluid flow-manager via a sixth connection point, out of said fluid flow-manager via said fourth connection point and into said fluid flow-manager via said fifth connection point;
in a sixth mode of operation, the valves of said flow manager are set such that source fluid circulates out of said fluid flow-manager via said first connection point and into said fluid flow-manager via said seventh connection point, out of said fluid flow-manager via said second connection point, into said fluid flow-manager via said third connection point, out of said fluid flow-manager via said fourth connection point and into said fluid flow-manager via said fifth connection point;
in a seventh mode of operation, the valves of said flow manager are set such that source fluid circulates out of said fluid flow-manager via said first connection point and into said fluid flow-manager via said second connection point, out of said fluid flow-manager via said seventh connection point, into said fluid flow-manager via said sixth connection point, out of said fluid flow-manager via said fourth connection point and into said fluid flow-manager via said fifth connection point;
in an eighth mode of operation, the valves of said flow manager are set such that source fluid circulates out of said fluid flow-manager via said first connection point and into said fluid flow-manager via said seventh connection point, into said fluid flow-manager via said third connection point, out of said fluid flow-manager via said fourth connection point and into said fluid flow-manager via said fifth connection point; and,
in a ninth mode of operation, the valves of said flow manager are set such that source fluid circulates out of said fluid flow-manager via said first connection point and into said fluid flow-manager via said second connection point, into said fluid flow-manager via said sixth connection point, out of said fluid flow-manager via said fourth connection point and in into said fluid flow-manager via said fifth connection point.

2. The source fluid flow-manager of claim 1, wherein,
in said first mode of operation, said first T-port valve is set to conduct fluid between a first port of the first T-port valve and a third port of the first T-port valve, said second T-port valve is set to conduct fluid between a first port of the second T-port valve and a third port of the second T-port valve, said third T-port valve is set to conduct fluid between all three ports of the third T-port valve, said first source fluid pump is operational, and said second source fluid pump is operational;

in said second mode of operation, said first T-port valve is set to conduct fluid between a second port of the first T-port valve and the third port of the first T-port valve, said second T-port valve is set to conduct fluid between a second port of the second T-port valve and the third port of the second T-port valve, said third T-port valve is set to conduct fluid between a first port of the third T-port valve and a second port of the third T-port valve, said first source fluid pump is operational, and said second source fluid pump is not operational;

in said third mode of operation, said first T-port valve is set to conduct fluid between the first port of the first T-port valve and the second port of the first T-port valve, said second T-port valve is set to conduct fluid between the first port of the second T-port valve and the second port of the second T-port valve, said third T-port valve is set to conduct fluid between the second port of the third T-port valve and a third port of the third T-port valve, said first source fluid pump is operational, and said second source fluid pump is not operational;

in said fourth mode of operation, said first T-port valve is set to conduct fluid between the first port of the first T-port valve and the second port of the first T-port valve, said second T-port valve is set to conduct fluid between the first port of the second T-port valve and the second port of the second T-port valve, said third T-port valve is set to conduct fluid between the second port of the third T-port valve and a third port of the third T-port valve, said first source fluid pump is not operational, and said second source fluid pump is operational;

in said fifth mode of operation, said first T-port valve is set to conduct fluid between the second port of the first T-port valve and the third port of the first T-port valve, said second T-port valve is set to conduct fluid between the second port of the second T-port valve and the third port of the second T-port valve, said third T-port valve is set to conduct fluid between the first port of the third T-port valve and the second port of the third T-port valve, said first source fluid pump is not operational, and said second source fluid pump is operational;

in sixth mode of operation, said first T-port valve is set to conduct fluid between the first port of the first T-port valve and the second port of the first T-port valve, said second T-port valve is set to conduct fluid between the first port of the second T-port valve and the second port of the second T-port valve, said third T-port valve is set to conduct fluid between the second port of the third T-port valve and the third port of the third T-port valve, said first source fluid pump is operational, and said second source fluid pump is operational;

in said seventh mode of operation, said first T-port valve is set to conduct fluid between the second port of the first T-port valve and the third port of the first T-port valve, said second T-port valve is set to conduct fluid between the second port of the second T-port valve and the third port of the second T-port valve, said third T-port valve is set to conduct fluid between the first port of the third T-port valve and the second port of the third T-port valve, said first source fluid pump is operational, and said second source fluid pump is operational;

in said eighth mode of operation, said first T-port valve is set to conduct fluid between the first port of the first T-port valve and the third port of the first T-port valve, said second T-port valve is set to conduct fluid between the first port of the second T-port valve and the second port of the second T-port valve, said third T-port valve is set to conduct fluid between the second port of the third T-port valve and the third port of the third T-port valve, said first source fluid pump is operational, and said second source fluid pump is operational; and in said ninth mode of operation, said first T-port valve is set to conduct fluid between the second port of the first T-port valve and the third port of the first T-port valve, said second T-port valve is set to conduct fluid between the first port of the second T-port valve and the third port of the second T-port valve, said third T-port valve is set to conduct fluid between the first port of the third T-port valve and the second port of the third T-port valve, said first source fluid pump is operational, and said second source fluid pump is operational.

3. The source fluid flow-manager of claim 2, further comprising, a source fluid utilizing module, a thermal exchange unit, a hot thermal storage and exchange unit, and a cold thermal storage and exchange unit; and, wherein, said source fluid utilizing module, said thermal exchange unit, said hot thermal storage and exchange unit, and said cold thermal storage and exchange unit are fluidly connected such that:

in said first mode of operation source fluid circulates exclusively from said thermal exchange unit to said source fluid utilizing module;

in said second mode of operation source fluid circulates exclusively from said cold thermal storage and exchange unit to said source utilizing module;

in said third mode of operation source fluid circulates exclusively from said hot thermal storage and exchange unit to said source utilizing module;

in said fourth mode of operation source fluid circulates exclusively from said thermal exchange unit to said cold thermal storage and exchange unit;

in said fifth mode of operation source fluid circulates exclusively from said thermal exchange unit to said hot thermal storage and exchange unit;

in said sixth mode of operation source fluid circulates from said hot thermal storage and exchange unit to said source fluid utilizing module, and source fluid circulates from said thermal exchange unit to said cold thermal storage and exchange unit;

in said seventh mode of operation source fluid circulates from said cold thermal storage and exchange unit to said source fluid utilizing module, and source fluid circulates from said thermal exchange unit to said hot thermal storage and exchange unit;

in said eighth mode of operation source fluid circulates from both said hot thermal storage and exchange unit and said thermal exchange unit to said source fluid utilizing module; and, in said ninth mode of operation source fluid circulates from both said cold thermal storage and exchange unit and said thermal exchange unit to said source fluid utilizing module.

4. The source fluid flow-manager of claim 3, wherein, said source fluid utilizing module is a heat pump, said thermal exchange unit is an above-ground thermal exchange unit and said hot thermal storage and exchange unit is an underground hot thermal storage-and-exchange region, and said cold thermal storage and exchange unit is an underground cold thermal storage-and-exchange region.

\* \* \* \* \*